United States Patent [19]

Honjo et al.

[11] Patent Number: 5,432,854

[45] Date of Patent: Jul. 11, 1995

[54] STEREO FM RECEIVER, NOISE CONTROL CIRCUIT THEREFOR

[75] Inventors: Kazunari Honjo, Huntsville; David L. Simpson, Jr., Meridianville, both of Ala.

[73] Assignee: Chrysler Corporation, Highland Park, Mich.

[21] Appl. No.: 272,967

[22] Filed: Jul. 11, 1994

Related U.S. Application Data

[63] Continuation of Ser. No. 22,587, Feb. 25, 1993, abandoned.

[51] Int. Cl.⁶ .............................................. H04H 5/00
[52] U.S. Cl. ...................................... 381/10; 381/11; 381/94
[58] Field of Search ............................ 381/10, 11, 13

[56] References Cited

U.S. PATENT DOCUMENTS

| | | | |
|---|---|---|---|
| 4,029,906 | 6/1977 | Takahaski | 179/15 BT |
| 4,063,039 | 12/1977 | Endres et al. | 179/15 BT |
| 4,390,749 | 6/1983 | Pearson | 179/1 GJ |
| 4,694,500 | 4/1987 | Tazaki et al. | 381/1 O |
| 5,035,643 | 7/1991 | Ueno | 381/94 |
| 5,036,543 | 7/1991 | Ueno | 381/13 |

OTHER PUBLICATIONS

Stremler, Ferrell G., *Introduction to Communication Systems*, 3rd Ed. Addison–Wesley Pub. Co., 1990, pp. 345–349.

*Primary Examiner*—Curtis Kuntz
*Assistant Examiner*—Mark D. Kelly
*Attorney, Agent, or Firm*—Wendell K. Fredericks

[57] ABSTRACT

A noise control system for a FM stereo receiver senses the presence of noise outside of the FM stereo transmission bandwidth at an output of a FM detector and uses variations of amplitude of the sensed noise to control stereo channel separation and audio bandwidth control circuits of a stereo decoder circuit of the stereo receiver.

9 Claims, 3 Drawing Sheets

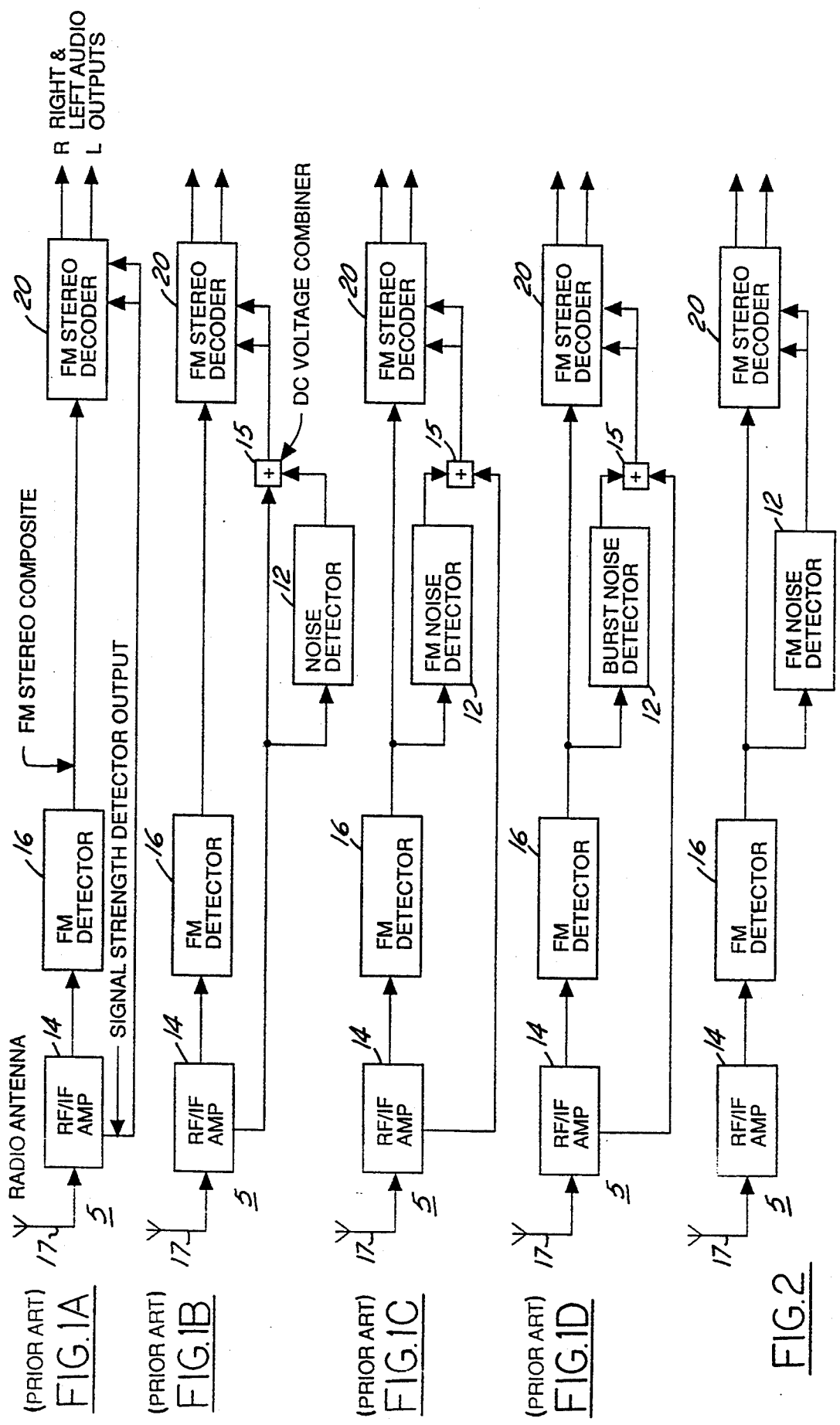

STEREO FM RECEIVER, NOISE CONTROL CIRCUIT THEREFOR

This is a continuation of U.S. patent application Ser. No. 08/022,587, filed Feb. 25, 1993, now abandoned.

FIELD OF THE INVENTION

This invention relates to noise control in a stereo FM receiver and more particularly to noise control systems responding to signal infidelity present in the frequency spectrum above the signal transmission band.

DESCRIPTION OF RELATED ART

Various noise interferences which include natural radio noise, unintentional man-made radio noise, and noise inherent to electronic components used in the receiver design affect reception of FM broadcast. Such noise interferences generally cause background hiss noise in the speaker output. The magnitude of hiss noise increases as signal strength decreases.

FM broadcast reception also suffers from so called multipath interference. This type interference occurs when signals of the same frequency arrive at a receiving antenna via multiple propagation paths. The process of summing signals at an antenna of a moving vehicle creates amplitude fluctuations and spurious phase modulations in the resulting combined signal. These characteristics appear because the amplitude and phase of each arriving signal varies with time as the location of the antenna moves. Multipath interference in the stereo FM receiver causes intermittent bursts of noise and/or distortion in the audio output signal emanating from the speakers.

To remedy the interferences described above, it is common practice to employ means to reduce audio bandwidth and stereo channel separation. Previous solutions to this problem employed RF signal strength detectors to determine when to activate the means used to reduce audio bandwidth and/or stereo channel separation. This practice does not necessarily provide optimum noise reduction characteristics under varying interference noise conditions. Employing radio signal strength detectors to sense noise provides an indirect approach to rectifying noise interference conditions. Illustratively, noise reduction control (i.e, reduction of audio bandwidth and stereo channel separation) is activated in response to radio signal strength and not in response to noise amplitude levels. This type of noise reduction control system is always activated regardless of the noise interference level if the radio signal strength resides below a predetermined signal detector sensitivity. Such system may provide noise reduction control when control is not needed causing only degradation of audio fidelity, or no control when noise reduction is desired.

Hence, to address the above mentioned shortcomings of prior systems, a search for various other ways to provide noise reduction control was initiated. This search resulted in the improved apparatus and techniques for noise control of the present invention.

SUMMARY OF THE INVENTION

The present invention discloses a noise control system for a FM stereo receiver using a noise canceller device in a preferred embodiment containing a high-pass filter which attenuates composite broadcast signals but passes noise and distortion spectrums falling above the FM broadcast transmission band. This system also includes a control voltage generator which accepts the filtered noise signal and then after processing, produces controlled voltage signals which drive the stereo channel separation and audio bandwidth circuits of a stereo decoder. These signals regulate the reductions in stereo channel separation and audio bandwidths needed for controlling noise appearing in the audio output signals emanating from the receiver speakers.

IN THE DRAWING

FIG. 1A through 1D illustrates in block-diagram form four prior noise reduction systems employing either a signal strength detector or a combination of a signal strength detector and a noise detector for use in a FM stereo receiver;

FIG. 2 depicts in block-diagram form the present noise reduction system employing a control voltage generator interconnected in a manner that avoids the use of a signal strength detector to effect noise control;

DETAILED DESCRIPTION OF A PREFERRED EMBODIMENT

Prior Stereo Systems

Figure 3:
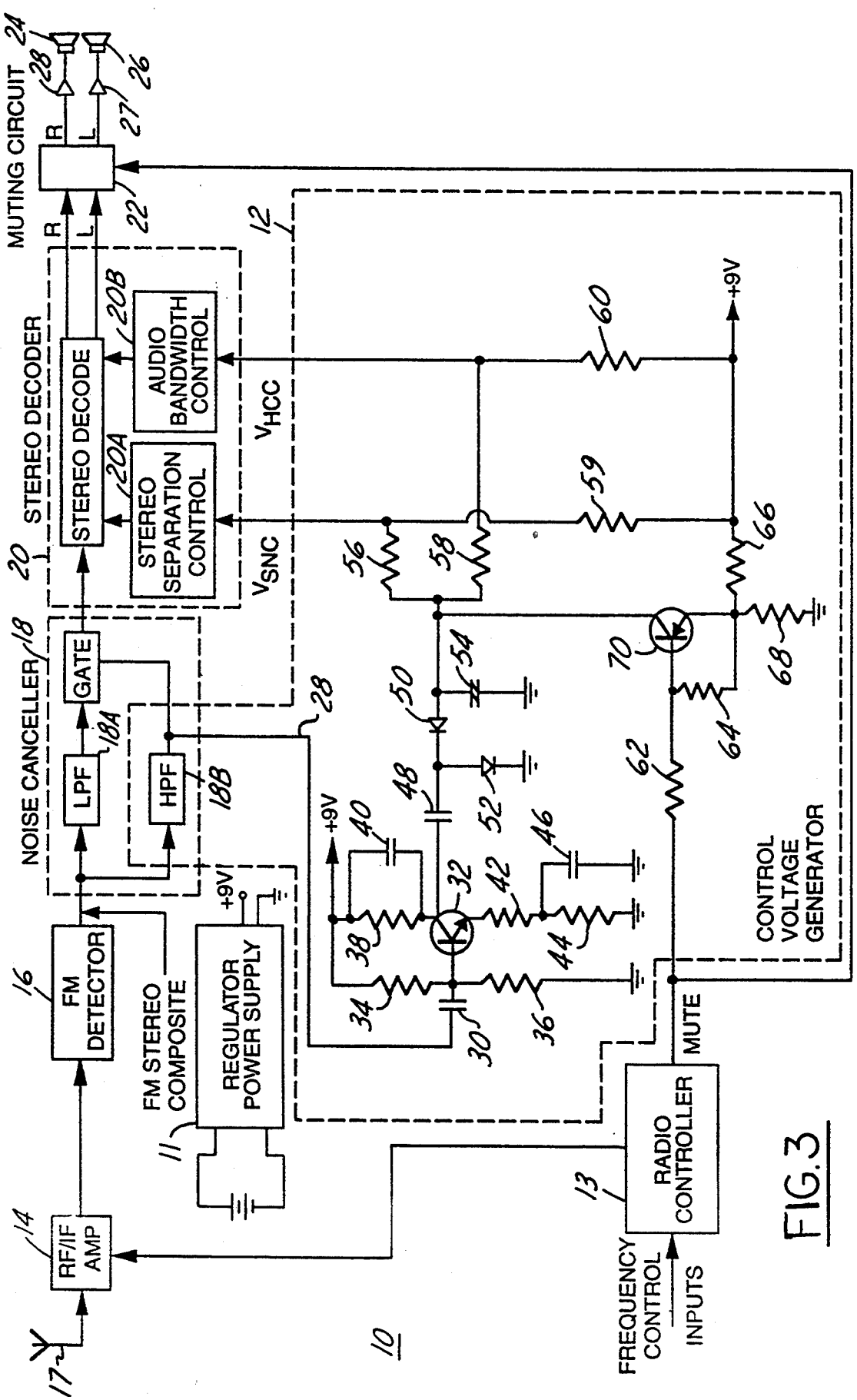
FIG. 3 illustrates partially in schematic and partially in block diagram form the stereo system of FIG. 2 that contains the control voltage generator circuit of the present invention.

Past FM stereo systems used circuits for reducing signal distortion by decreasing stereo channel separation and/or audio bandwidth of the detected FM stereo signal, FIG. 1A depicts a prior system 5A employing a radio signal strength detector circuit (not shown) of a predetermined sensitivity in an RF/IF amplifier 14 that produces an output signal proportionate to the incoming radio signal strength, This output signal applies to noise control circuits in a FM stereo decoder 20 which are activated when the radio signal from antenna 17 falls below the predetermined sensitivity of the signal strength detector circuit, FIG. 1B illustrates another prior system 5B that employs the same signal strength detector in amplifier 14 of FIG. 1A, Noise detector circuit 12 detects noise superimposed on the DC output signal coming from the signal strength detector circuit in RF/IF amplifier 14, Outputs of the signal strength detector and the output of the noise detector circuit combine in combiner circuit 15 to provide control signals used to drive the noise control circuit in decoder 20. The noise control circuit is activated if the signal strength goes below a predetermined level or the noise input to noise detector 12 is above a predetermined level.

FIG. 1C depicts another prior system 5C that employs the signal strength detector of FIG. 1A along with a noise detector 12 which is driven from the output of FM detector 16. Outputs of the signal strength detector and the noise detector combine in combiner circuit 15 to generate control signals used to drive the noise control circuits in decoder 20. The noise control circuit of this system is activated when the radio signal falls below a predetermined level or the noise input to noise detector 12 is above a predetermined level.

FIG. 1D illustrates still another prior system 5D employing the signal strength detector of FIG. 1A along with noise detector 16 which is driven from the output of FM detector 16. Detector 16 responds only to burst noise and does not respond to broadband continuous noise. Output signals of the two detectors combine in combiner circuit 15 to provide control signals used to drive the noise control circuits in decoder 20. Noise control in this arrangement activates if the radio signal from anntenna 17 is below a predetermined level or the input to noise detector 12 is above a predetermined level.

In the systems as illustrated in FIGS. 1B through 1D, the noise detectors 12-12 contribute to effect the noise reduction only when incoming radio signals from antenna 17 are relatively strong or above a predetermined sensitivity of the signal strength detectors and the noise levels entering the noise detectors 12-12 are above a predetermined sensitivity.

The signal strength detector outputs will always activate the noise reduction systems when the incoming radio signal levels fall below a predetermined sensitivity of the signal strength detectors. These results may cause improvement or degradation of the audio fidelities depending on the prevailing noise interference conditions and the predetermined sensitivity thresholds.

The Present Invention

FIG. 2 depicts in block diagram form the FM stereo system 10 of this invention which employs control voltage generator circuit 12 as a sensor for the noise control system. Control voltage generator circuit 12 detects noise appearing in a frequency spectrum above the FM broadcast band at the output of FM detector 16. The DC voltage signals fed to FM stereo decoder 20 to effect noise control are derived only from noise detection. Generator circuit 12 responds to either continuous broadband noise or burst noise. Noise reduction occurs if the detected noise is above a predetermined level. The noise may include broadband or white noise, bursts of noise caused by decreases in the signal strength, increases of the environmental noise or multipath propagation of the radio signal from antenna 17.

Control Voltage Generator Circuit

FIG. 3 illustrates in part block-diagram and part schematic-diagram form an FM stereo receiver 10 incorporating the control voltage generator circuit 12 of the present invention. Receiver 10 is a conventional superhetrodyne receiver with frequency down conversion for a 10.7 Mhz IF frequency. In addition to circuit 12, receiver 10 includes a RF/IF amplifier 14 having a local oscillator and a frequency converter, a radio controller system 13, an FM detector 16, a noise canceller 18, a stereo decoder 20, a muting gate 22, left and right amplifiers 27 and 28 respectively, and right and left speakers 24 and 26 respectively.

FM detector 16 demodulates the FM stereo composite signal which occupies a frequency bandwidth of about 80 kHz including SCA.

The noise canceller 18 processes the output signal from FM detector 16 to remove repetitive pulse noises such as interference from car engines.

The decoder 20 demodulates the stereo composite signal into right and left channel audio output signals.

These outputs signals are routed through muting gate 22 to amplifiers 27 and 28 to drive speakers 24 and 26.

In the preferred embodiment, noise canceller circuit 18 may be a STK3400B noise canceller circuit from Sanyo Electric Co., Ltd., which also includes a stereo decoder 20 in the same package. However, from the noise canceller circuit, only the HPF is necessary to effect noise control.

Noise disturbances, including multipath noise, is detected at the output of FM detector 16 through high-pass filter (HPF) 18B of noise canceller 18. HPF 18B has a cut-off frequency of about 100 kHz. The HPF output signal is routed to control voltage generator 12 through conductor 28.

Capacitor 30 couples the high-pass filtered output to the base of transistor 32 configured as a common-emitter, low-pass, noise amplifier. Transistor 32 is biased to operate as a linear mode amplifier. Resistors 34, 36, 46 and 44 establish the DC bias current of this linear mode amplifier. Resistors 42 and 38 essentially set the gain of this amplifier.

The collector resistor 38 and capacitor 40 form a low-pass filter having a cut-off frequency of about 150 kHz. This low-pass filter cascades with HPF 18B. The combined transfer characteristic of these two filters form a bandpass filter having a pass-band spanning from about 100 to 150 kHz. Control voltage generator 12, thus, responds to noise in the output of FM detector 16 whose spectrum falls within the above pass band.

Capacitors 48 and 54 and diodes 50 and 52, configured as shown, form a noise rectifier circuit. When noise is not present or very low within the pass band, DC voltage at the anode of diode 50 relative to ground is about $+0.7$ VDC. This anode voltage is established by current which forward biases diode 50 through resistors 56, 58, 59 and 60. When noise levels at filter 18B rise above a predetermined level, the noise rectifier circuit will rectify the noise signal at the collector output of transistor 32 and cause the DC voltage at the anode of diode 50 to decrease towards about $-4.0$ VDC. The magnitude of the DC voltage at the anode of diode 50 is determined by the noise level at the output of FM detector 16. The greater the noise, the lower the DC voltage.

Decoder 20 includes a stereo channel separation control circuit 20A, and an audio bandwidth control circuit 20B. These circuits provide the capability of reducing the stereo channel separation and the audio bandwidth of the output of the output of decoder 20 in response to the control input signals $V_{HCC}$, (HCC means high cut control) the audio bandwidth control and $V_{SNC}$ (SNC means stereo noise control), the stereo separation control.

Reducing $V_{HCC}$ and $V_{SNC}$ below a predetermined level, decreases the stereo channel separation and audio bandwidth. Resistors 56 through 60 individually set the sensitivities of the stereo channel separation and audio bandwidth controls. Here, sensitivity means the amount of change in the control signals in response to changes in magnitude of noise present at the output of FM detector 16. Sensitivity may be represented by a noise level at which control or reduction of the stereo channel separation or the audio bandwidth begins.

Also, control voltage generator circuit 12 features a response characteristic of quick attack and slow release with regard to the DC control signals. $V_{HCC}$ and $V_{SNC}$ control signals decrease quickly when noise fed to transistor 32 increases and these signals remain decreased for a predetermined period even after the noise subsides.

Also in control voltage generator 12, transistor 70 operating in a switch mode, and the associated biasing network consisting of resistors 62, 64 66 and 68 shortens the release time which is necessary when changing reception frequencies of radio controller 13.

When the tuning frequency is changed, a transient noise burst may develop in the output of FM detector 16 causing a negative charge to appear at capacitor 54. The muting control output, MUTE from radio controller 13 goes to a ground potential momentarily whenever the tuning frequency is changed. Transistor 70 turns on to charge capacitor 54 very quickly towards a positive potential before the MUTE signal reverts back to the high voltage state. This circuit, a reset circuit, assures a positive charge across capacitor 54 when the reception at a new frequency begins. Without this circuit, even though a strong local station is selected, the reception begins in the monaural mode with reduced treble and remains so for a period of time before the mode changes to stereo with full treble response.

OPERATION OF THE SYSTEM

In discussing the operation of the system, refer again to FIG. 3 and FIGS. 4 and 5. Assume that a vehicle equipped with a stereo FM radio system of the type depicted in FIG. 3 receives a stereo broadcast.

STEREO CHANNEL SEPARATION

FIGS. 4A and 4B depicts simulations of decoder 20 output signals in the right and left channels of the stereo broadcast. FIG. 4C depicts inadvertent noise arriving at the input to HPF 18B.

Prior to the appearance of the noise burst during the first 0.5 second (in FIG. 4C), the decoder 20 operates as a stereo decoder. During the next one (1) second period as shown in FIG. 4C, a noise burst of about one (1) second duration appears at the input of HPF 18B of FIG. 3. Control voltage generator 12 receives the filtered output signal from HPF 18B, processes this signal and then generates a decreased $V_{SNC}$ control signal which applies to and controls stereo channel separation control 20A. Under the above condition, the decoder 20 no longer functions as a stereo decoder. Decoder 20 now puts out the same amount of signals at both the left and right outputs as shown, in FIG. 4A and 4B.

When the noise subsides, after, illustratively 1.5 seconds, $V_{SNC}$ remains decreased over the next 2 seconds before recovery of the stereo response takes place. The audio output response remains monaural over this span of time.

Figure 4:
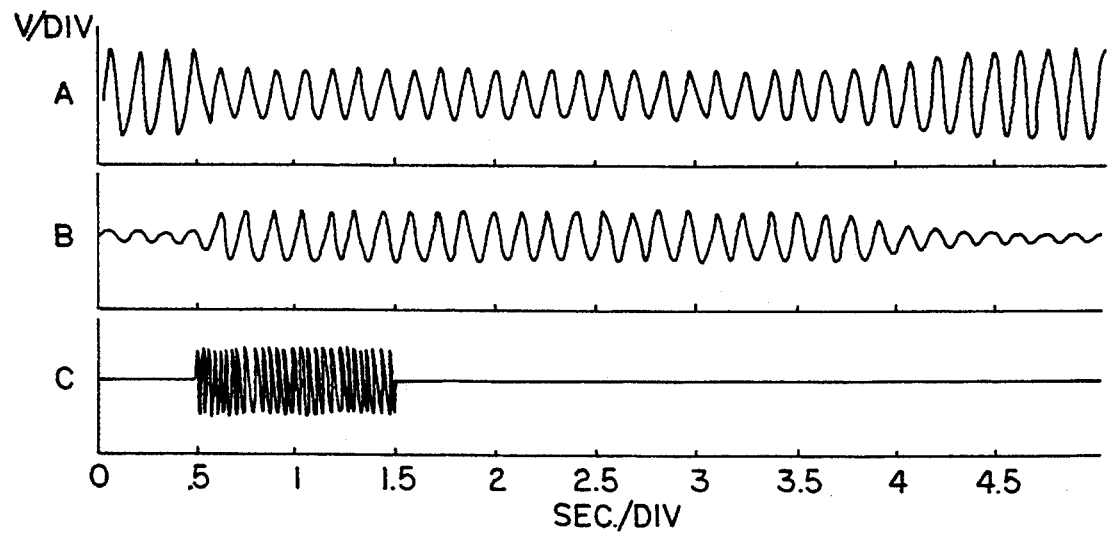
FIG. 4 depicts stereo channel separation occurring at the output of a FM stereo decoder in response to noise appearing at the input of the high-pass filter.
Figure 5:
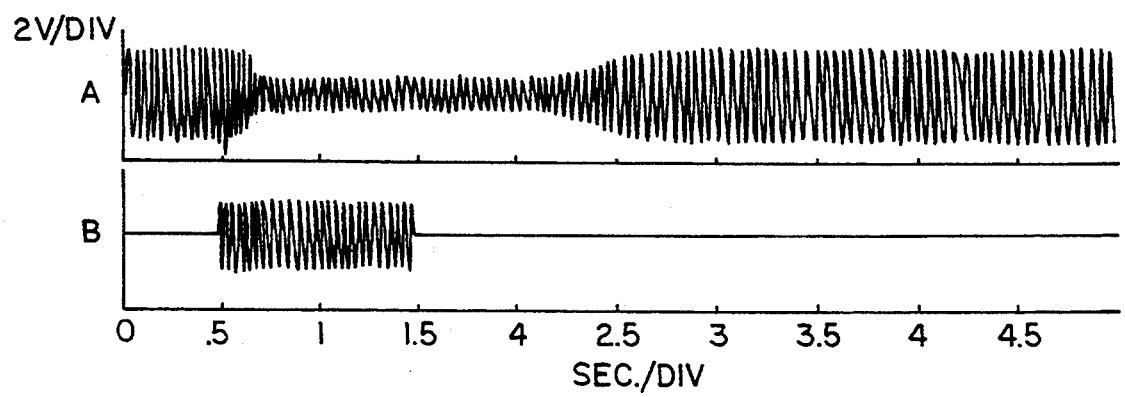
FIG. 5 depicts bandwidth reduction in the stereo decoder in response to noise also appearing at the input of the high-pass filter.

As $V_{SNC}$ gradually increases between the time span of about 3.5 seconds to 4 seconds in FIG. 4, the stereo channel separation gradually increases until the full stereo signal reappears.

AUDIO BANDWIDTH CONTROL

FIGS. 5A depicts a simulation of a 10 kHz audio frequency signal at an output of stereo decoder 20. FIG. 5B simulates a 1 second noise burst signal arriving at the input of HPF 18B a ½ second later. HPF 18B filters the noise signal and then feeds the filtered signals to control voltage generator 12. Generator 12 produces the audio bandwidth control signal $V_{HCC}$.

As shown in FIG. 5A, the audio output signal decreases rapidly in amplitude in response to rapid decreases in the amplitude of the $V_{HCC}$ signal. $V_{HCC}$ remains low for about ½ second after removal of the noise and then it gradually rises during another ½ second to restore the range of bandwidth of the audio output signal.

Although the present invention has been described with reference to a preferred embodiment, numerous modifications and rearrangements can be made, and come within the scope of the invention.

I claim:

1. A noise control system for use in a FM stereo receiver having a FM detector for demodulating FM stereo composite signals, and a stereo decoder circuit containing stereo channel separation and audio bandwidth control circuits for controlling noise in the audio output of the stereo receiver, the noise control system comprising:
    a) a high-pass filter to extract high frequency Noise spectra falling above the FM composite signal band from the output of the FM detector;
    b) a noise amplifier circuit having a controlled low-pass characteristic which accepts the output of the high-pass filter and then produces at an output bandpass filtered noise;
    c) a rectifier circuit driven by the output of the noise amplifier to provide d-c output signals in response to peak amplitudes of the noise at the output of the noise amplifier;
    d) a resistor network connected between the rectifier circuit and the stereo decoder for adjusting the d-c output signals before routing the d-c output signals to the inputs of the stereo channel separation control and the audio bandwidth control; and
    e) a reset circuit to suppress development of the rectifier circuit output due to transient noise or to force the rectifier output to provide normal stereo reception when the radio controller is operated to change the reception frequency.

2. Apparatus of claim 1 wherein the noise amplifier circuit contains a low-pass filter that is cascaded with the high-pass filter to form a band-pass filter which provides band-pass filter noise, the bandwidth of the filtered noise being determined by the frequency response of the cascaded high-pass and low-pass filters.

3. Apparatus of claim 2 wherein the control voltage signal from the noise rectifier circuit provides a varying d-c signal which varies in response to increases and decreases in the peak amplitude of the bandpass filtered noise.

4. Apparatus of claim 3 wherein the resistor network sets the sensitivities of the stereo separation and audio bandwidth controls.

5. Apparatus of claim 4 wherein the noise rectifier circuit provides the control voltage signal almost immediately in response to noise entering the system, the DC output voltages being held decreased for a predetermined period after the noise subsides providing a response characteristic of quick attack and slow release, wherein the sensitivities of the stereo channel separation and audio bandwidth controls are individually set by the resistor network disposed between the output of the rectifier circuit and the separation and bandwidth controls.

6. Apparatus of claim 5 wherein the rectifier circuit provides quick engagement of the noise reduction control in response to occurrences of noise interference, and delayed disengagement of the control when noise interference disappears.

7. Apparatus of claim 6 wherein the reset circuit provides a preset d-c voltage to the resistor network to set the decoder operation for stereo decoding prior to the beginning of reception after the tuning frequency is changed.

8. Apparatus of claim 7 wherein the reset circuit momentarily removes the effect of transient noise in response to a control input signal from the radio controller and wherein the control circuit suppresses development of the rectifier circuit output due to internally generated transient noise or to force the rectifier output into normal stereo performance when the radio controller is operated to change the reception frequency.

9. Apparatus of claim 1 wherein the noise control system may be employed in a mobile FM stereo receiver to counter the effect of multipath distortion.

* * * * *